Figure 1:
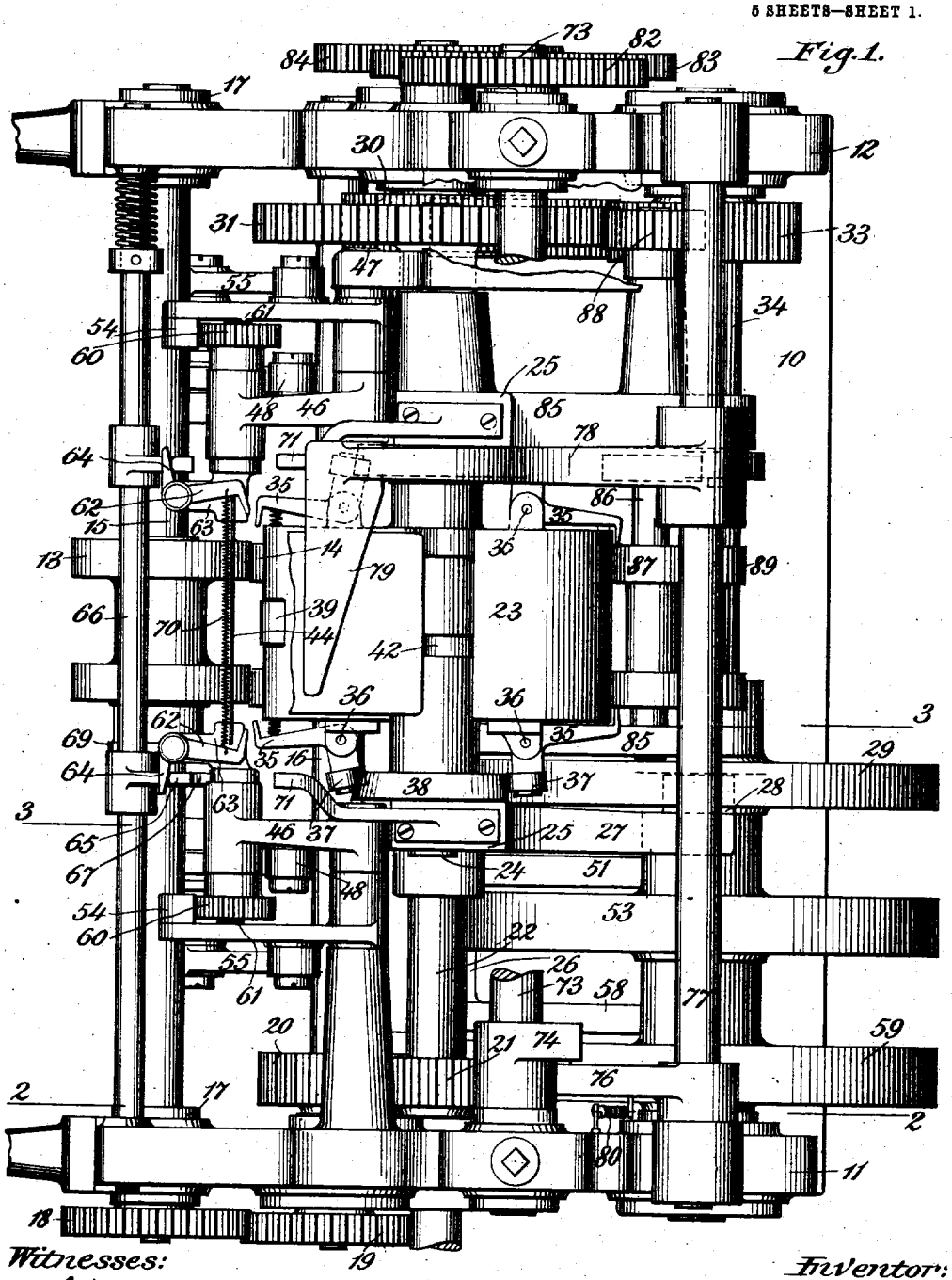

No. 12,651. REISSUED MAY 14, 1907.

W. A. LORENZ.

PAPER BAG MACHINE.

APPLICATION FILED APR. 15, 1907.

5 SHEETS—SHEET 1.

Witnesses:

H. Mallner

Janette P. Ellsworth

Inventor:

William A. Lorenz

THE NORRIS PETERS CO., WASHINGTON, D. C.

No. 12,651. REISSUED MAY 14, 1907.

W. A. LORENZ.

PAPER BAG MACHINE.

APPLICATION FILED APR. 15, 1907.

5 SHEETS—SHEET 2.

Witnesses:

H. Mallner

Janette S. Ellsworth

Inventor:

William A. Lorenz

THE NORRIS PETERS CO., WASHINGTON, D. C.

No. 12,651. REISSUED MAY 14, 1907.

W. A. LORENZ.

PAPER BAG MACHINE.

APPLICATION FILED APR. 15, 1907.

5 SHEETS—SHEET 3.

Witnesses:

H. Mallner

Janette S. Ellsworth

Inventor:

William A. Lorenz

THE NORRIS PETERS CO., WASHINGTON, D. C.

No. 12,651. REISSUED MAY 14, 1907.

W. A. LORENZ.

PAPER BAG MACHINE.

APPLICATION FILED APR. 15, 1907.

5 SHEETS—SHEET 4.

Witnesses:

H. Mallner

Janette S. Ellsworth

Inventor:

William A. Lorenz

THE NORRIS PETERS CO., WASHINGTON, D. C.

No. 12,651. REISSUED MAY 14, 1907.

W. A. LORENZ.

PAPER BAG MACHINE.

APPLICATION FILED APR. 15, 1907.

5 SHEETS—SHEET 5.

Witnesses:

H. Mallner

Janette S. Ellsworth

Inventor:

William A. Lorenz

THE NORRIS PETERS CO., WASHINGTON, D. C.

UNITED STATES PATENT OFFICE.

WILLIAM A. LORENZ, OF HARTFORD, CONNECTICUT, ASSIGNOR TO UNION PAPER BAG MACHINE COMPANY, OF PHILADELPHIA, PENNSYLVANIA, A CORPORATION OF PENNSYLVANIA.

PAPER-BAG MACHINE.

No. 12,651. Specification of Reissued Letters Patent. Reissued May 14, 1907.

Original No. 847,192, dated March 12, 1907. Application for reissue filed April 15, 1907. Serial No. 368,400.

*To all whom it may concern:*

Be it known that I, WILLIAM A. LORENZ, a citizen of the United States, residing at Hartford, in the county of Hartford and State of Connecticut, have invented certain new and useful Improvements in Paper-Bag Machines, of which the following is a full, clear, and exact specification.

This invention relates to paper bag machines and more especially to that class thereof in which square-bottom bags are formed from bellows-sided or tucked tubing, and it has for one of its objects the provision of a machine whereby the so called "diamond fold" is formed while the sides of the tube are maintained in a separated or open condition, preparatory to having its flaps supplied with paste and subsequently folded to complete the bag.

My invention includes as one of its features a blank-folding member having a bottom-defining edge coöperative with a suitable blank-carrier or support, and adapted to open the blank or tube to the required extent, the blank-folding member and the carrier being maintained in proper relationship to each other so as to form the diamond-fold in an easy and rapid manner.

While, in the present instance, the blank-folding member has an oscillatory movement in its support, the blank-carrier is of the shiftable type controlled and positioned by a suitable mechanism, so that as the defining edge of the blank-folding member turns upon its supporting axis, the blank-supporting surface of the carrier will be shifted away from the defining edge, so as to maintain proper separation of the sides of the tube or blank.

My invention therefore, includes a rotatable blank-carrier coöperative with an oscillatory blank-folding member, and having a shiftable axis to preserve the proper separation between the defining edge and the blank-supporting surface of the carrier during the diamond-forming operation.

The blank-carrier is preferably of the rotary type and proper movement is imparted to the blank-folding member to permit the defining edge to travel forward in unison with the blank-supporting surface of the carrier during the diamond-forming operation, and in order to gain more time during this period, the pivot support of the blank-folding member is caused to advance with the blank-receiving surface of the carrier. This gain of time is chiefly due to the organization of the device which carries the blank-folding member, the latter being mounted for movement, bodily, with the carrier and consequently adapted for coöperation therewith for a greater arc or a greater linear travel of the blank-supporting surface of the carrier, than is possible when the support of the folding member is stationary. My invention, therefore, includes an improved carrier for the blank-folding member, said carrier being pivoted on a fixed axis and adapted to carry the member bodily in the direction of the movement of the blank-carrier during the diamond-folding operation.

A further object of my invention may be found in the combination, with an oscillatory blank-folding member which is pivotally supported in an advanceable carrier therefor; of a rotatable blank-carrier having a shiftable axis so that, as the defining edge of the blank-folding member is caused to advance in unison with the blank-supporting surface of the carrier during its forward stroke, the blank-carrier itself is moved toward and from the defining edge.

While, generally, a blank-folding member mounted in accordance with my invention, viz: in a carrier which is advanceable with the blank-carrier, may be advantageously employed where the blank-carrier and the defining edge travel in close contact with each other during the working stroke, yet I consider that it is a matter of great importance to maintain the defining edge of the blank-folding member at a substantial distance from the blank support so that, as the latter and the blank-folding member coact in opening out the end of the blank, the so called "inside triangular folds" may be easily developed by stretching out the tucked sides of the tube or blank.

Figure 2:
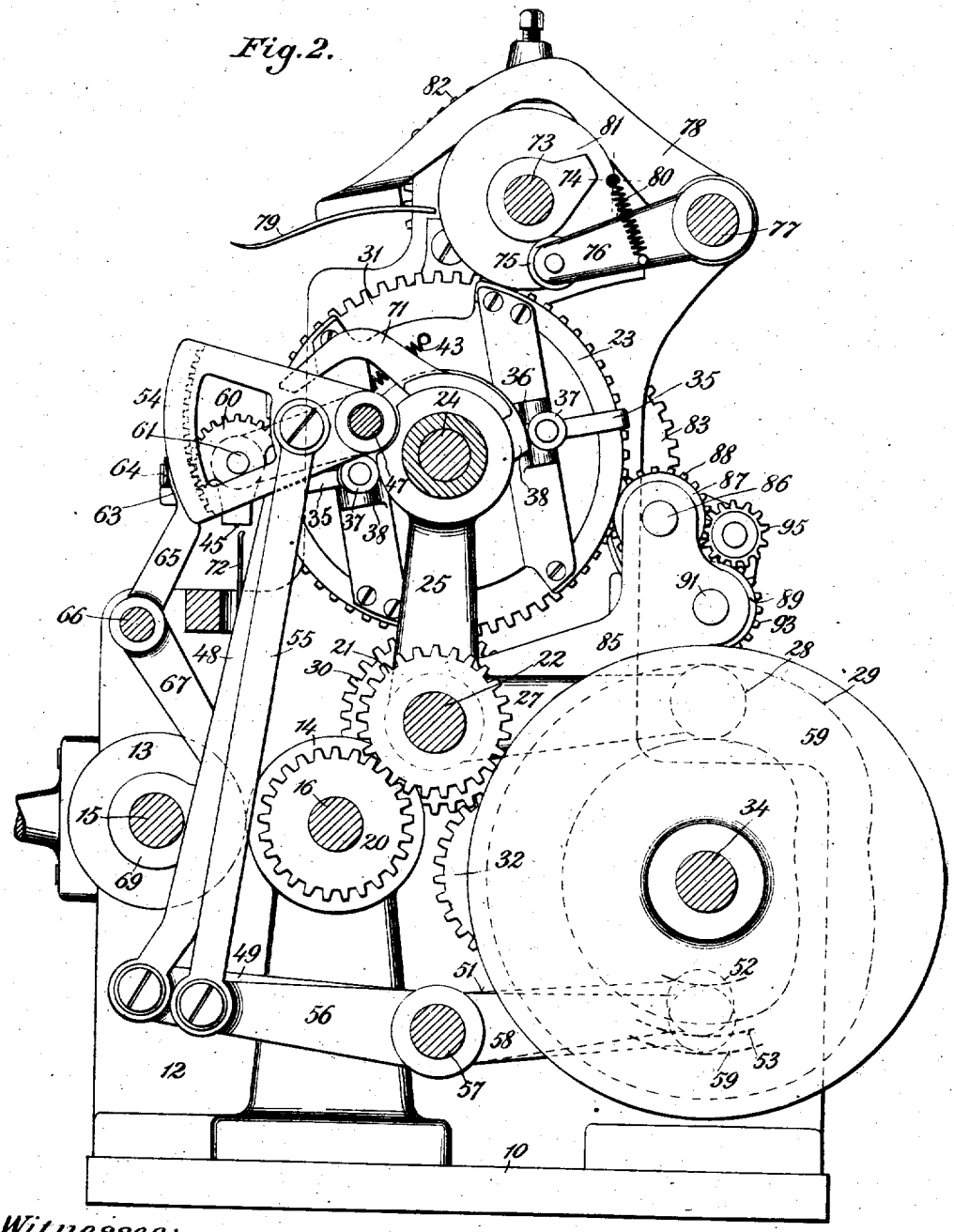
Figure 3:
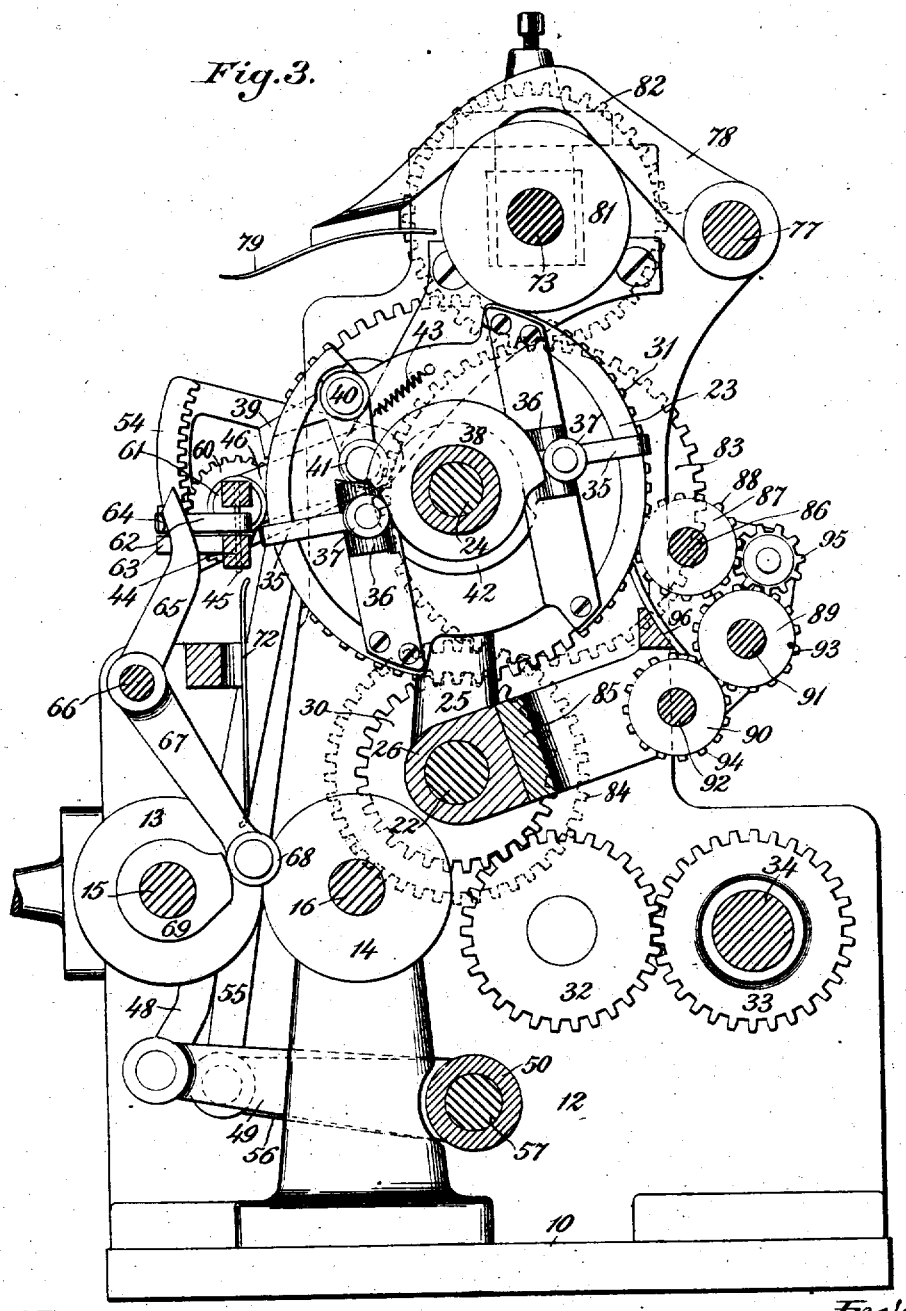
Figure 4:
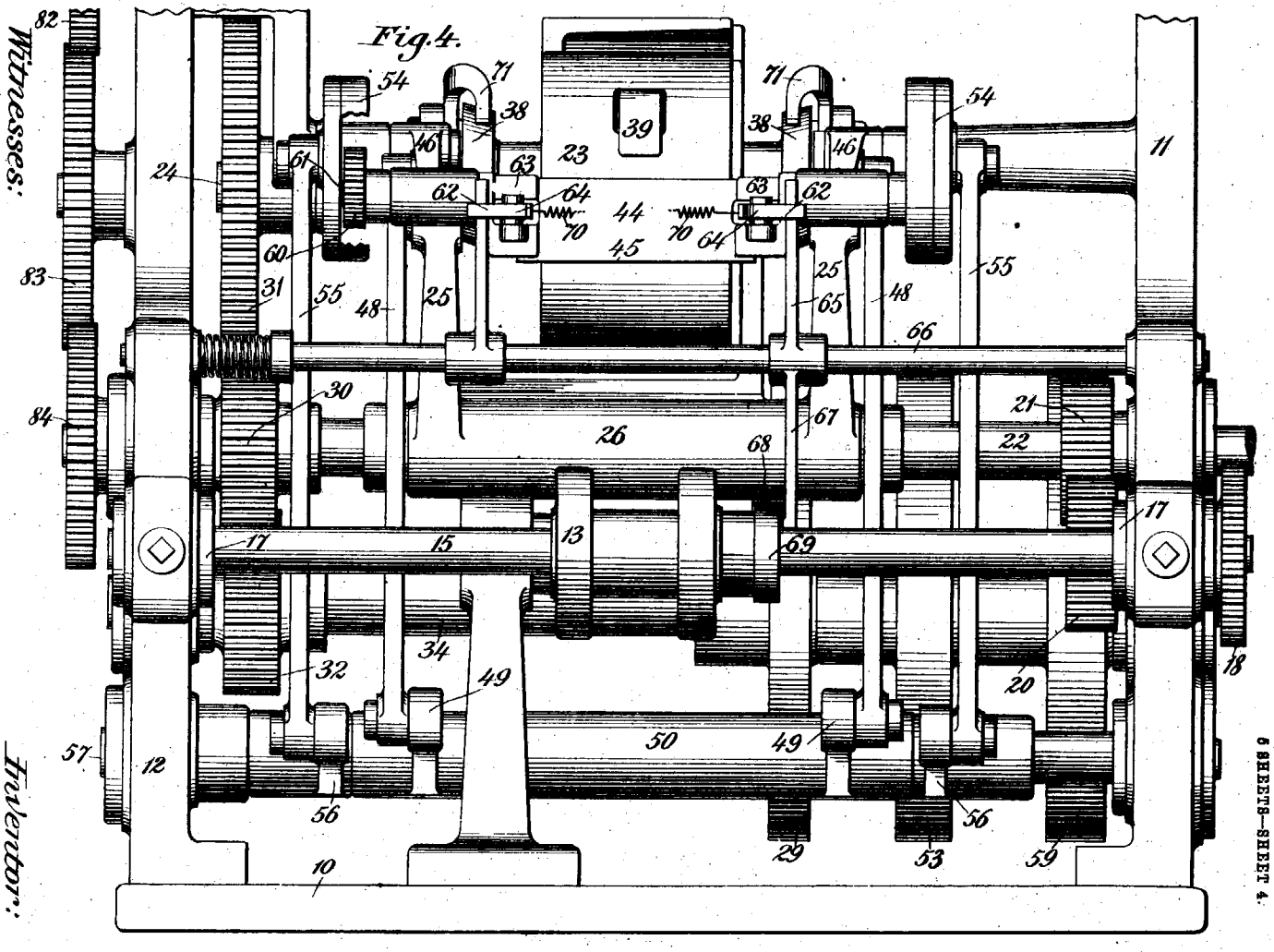
Figure 7:
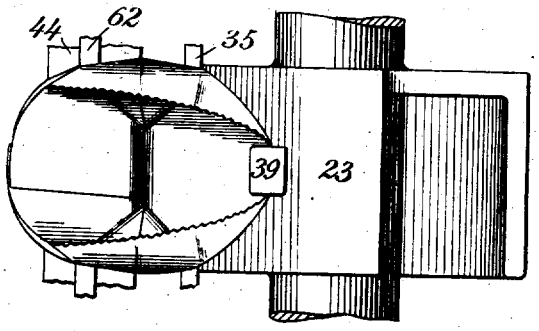
Figure 9:
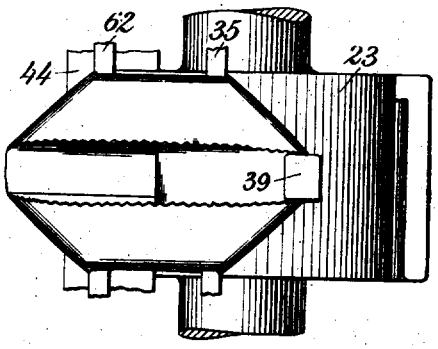
Figure 5:
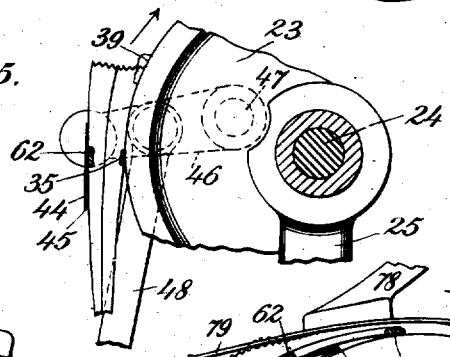
Figure 6:
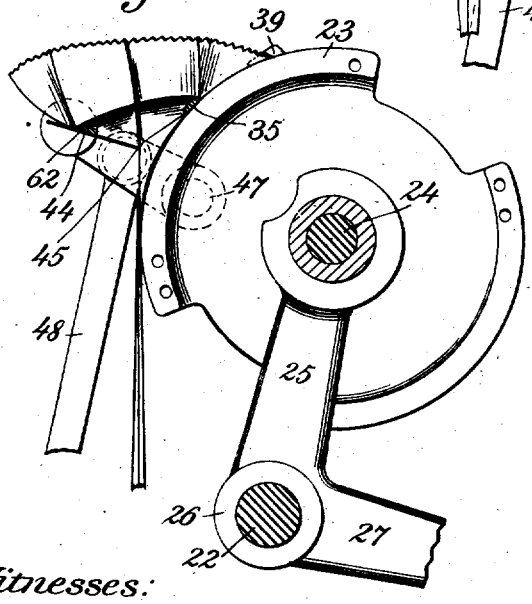
Figure 8:
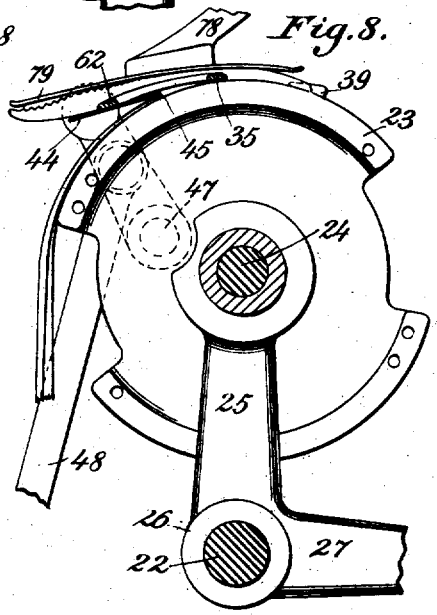

In the accompanying drawings in which similar characters designate similar parts, Figure 1 is a top view of a paper bag machine constructed in accordance with my invention. Fig. 2 is a vertical section of the same taken on line 2—2, Fig. 1. Fig. 3 is a similar section taken on line 3—3, Fig. 1. Fig. 4 is a side view of the machine looking from the left of Fig. 2. Fig. 5 is a fractional side view of the blank-carrier illustrating the relative positions of said carrier and the blank-folding member after a blank or bag length has been introduced into the machine and gripped. Fig. 6 is a side view of the carrier and the folding member showing the parts in position when the end of the tube has been opened-out sufficiently to form what is ordinarily called the "box" and the inner triangular folds of the blank. Fig. 7 is a top view corresponding to Fig. 6. Fig. 8 is a view similar to Fig. 6 illustrating the parts in position after the diamond has been substantially completed, and Fig. 9 is a top view corresponding to Fig. 8.

In the accompanying drawings, 10 designates the bed plate of a machine to which are secured upright side frames 11 and 12 in which the several coöperating shafts for driving the various devices are supported. Suitable means are provided for feeding blanks or bellows-sided tubing into the machine, such means consisting, in the present instance, of suitable feed rollers 13 and 14 mounted on shafts 15 and 16 respectively, the former being journaled in movable boxes 17 (see Figs. 1 and 4) acted upon by suitable springs. (Not shown.) The feed rollers are caused to coöperate with each other by means of gears 18, 19 mounted on said shafts 15 and 16, the latter of which carries a gear 20 obtaining motion from a similar gear 21 secured to a shaft 22 which constitutes the main driving shaft of the machine.

From the feed rollers the blank or tube is conducted to a suitable blank support or carrier for receiving and holding the blank during the bottom or diamond-forming operation. Connected for coöperation with the carrier is a blank-folding member adapted for engaging the upper ply or tube of the blank—while the carrier is provided with means whereby the lower ply of the blank is securely held in place, both carrier and blank-folding member coacting to open-out the end of the blank and form the diamond, as will hereinafter appear. The carrier is, in this instance, of the rotary type and consists substantially of a cylinder 23 mounted upon a shaft 24 journaled in a pair of arms 25 which are connected at their lower ends by a sleeve 26 so as to form a unitary structure. The sleeve 26 is loosely mounted upon the shaft 22 above mentioned and carries at one end thereof an arm 27 which carries at its free end a cam roller 28 adapted for engagement with a cam 29 whereby proper oscillatory movement may be imparted to the arms 25 which support the carrier 23 as above stated. The carrier receives its rotary movement in this instance, through a gear 30 secured to the shaft 22 and in engagement with the carrier gear 31 secured to the shaft 24, and said gear 30 is also in mesh with an intermediate 32 which is driven from a pinion 33 mounted upon the shaft 34 which constitutes the main cam shaft of the machine and upon which the above mentioned cam 29 is secured.

The means for holding the lower ply of the tube on the carrier consist preferably of a pair of spring-operated tuck-holders 35 journaled at 36 on the carrier and carrying cam rollers 37 which are adapted to travel around the periphery of suitable cams 38 whereby the tuck-holders are caused to grip the blank on both sides simultaneously and at the proper time. The carrier 23 is also provided with a device for gripping or holding the front end of the lower ply of the tube or blank, this device being shown as a front diamond holder 39 journaled at 40 on the carrier, and carrying a roll 41 in engagement with a cam 42 whereby as the carrier rotates, said holders 39 will be caused to release the blank at a certain time, while a spring 43 may be employed for closing said holder over the lower ply of the blank.

Connected for coöperation with the blank support are blank-folding devices or mechanism including a member for engaging the upper ply of the tube or blank, and means for securing said ply against said member said member being herein illustrated as a plate 44, one edge, as 45, of which serves as a bottom-defining edge, and which is mounted for oscillation in a carrier comprising a pair of arms 46 which in their turn may be mounted for oscillation upon studs 47. Each of the arms 46 is, in this instance, pivotally connected to a link 48, the lower end of which is attached to an arm 49, both of said arms 49 being connected, to move in unison, by a sleeve 50 which carries an arm 51 having a cam roller 52 in engagement with a cam 53 whereby proper oscillatory movement may be imparted to the above mentioned arms 46, so as to cause the pivot support of the blank-folding member to advance in the direction of travel of the blank-carrier during the diamond-forming operation. Means are provided whereby the blank-folding member 44 is oscillated in its support, and the oscillatory movement of said member is so timed in connection with the mechanism whereby the arms 46 are oscillated at their point of support that the defining edge 45 will move in unison with the carrier during the forward stroke thereof. The means for oscillating the blank-folding member in its support consists preferably of sectors 54 loosely journaled on the studs 47 and connected by means of links 55 with arms 56 which are secured upon a shaft 57 journaled in the side frames of the machine. This shaft carries also an arm 58 engaged by a cam 59 whereby the sectors 54 are rocked to impart an oscillatory movement to a pair of pinions 60 in engagement therewith, said pinions being directly connected to the trunnions 61 forming the pivot journals of the blank-folding member.

The means whereby the upper ply of the blank is secured to, and held on, the blank-folding member, consist, in the present instance, of box-holders pivoted in extensions 63 of the blank-folding member, and having tail pieces 64 to be engaged for opening the holders, at the blank receiving end of the stroke, by abutments 65 which are preferably movable and pivotally supported on a spindle 66 held in the side frames. The spindle 66 is provided with an arm 67 which carries a cam roller 68 in engagement with a cam 69 which may be mounted upon the feed roll-shaft 15. The box-holders may be operated to close against the plate 44 by a suitable spring such as 70 connected with both holders, see Fig. 1. The means provided for opening the box-holders in order to release the blank at the end of their working stroke, which position is indicated by Fig. 8, consist, in this instance, of cam arms 71 secured to the bearings formed at the outer ends of the carrier supporting arms 25. (Figs. 2 and 4.) It has also been stated above that the blank-folding member and the blank-carrier should be maintained in proper relationship to each other so as to form the diamond fold in an easy and rapid manner, the defining edge of said member and the blank supporting surface of the blank carrier being caused to follow separated paths during the diamond folding operation. I therefore employ for coöperation therewith, a blank-carrier having a shiftable axis, so that the proper distance between the defining edge and the blank-carrying surface of the carrier be maintained, while the said carrier and said member coact in opening-out the open end of the bag blank and in developing the so called "inside triangular folds" by stretching out the tucked sides of the tube or blank. In order to vary the shifting movement of the blank-carrier axis relative to the movement of the defining edge, the cam 29 whereby said axis is shifted to maintain a proper separation of the tucked tube sides, may be changeable to suit the different requirements of different thicknesses and kinds of material from which the bags are to be made.

Interposed between the feed rolls 13, 14 and the carrier 23, is a guide plate 72 whereby the blank as it is fed forward by the feed rolls, will be guided with its front end between the folding member and the carrier.

Journaled in the side frames and near the upper ends thereof is a shaft 73 carrying a cam 74 in engagement with a roll 75 journaled on a lever 76 for operating the drop plate, whereby the diamond will be flattened. The arm 76 is secured to a shaft 77 which also carries an arm 78, at the free end of which the drop plate 79 is secured. It will therefore be evident that a rotation of the shaft 73 will result in operating the drop plate toward the blank-carrier and against the action of a spring such as 80 whereby said drop plate is again raised.

When the diamond has been flattened by the drop plate, the bag may be carried by the blank-carrier into contact with a paster roll 81 mounted on the shaft 73 which may receive its rotary movement through a gear 82 held on said shaft 73 and meshing with an intermediate 83 journaled on a stud which is held in the side frame 12, while the intermediate 83 is in turn engaged by a gear 84 secured to the driving shaft 22 above mentioned.

Secured to the sleeve 26 of the blank-carrier rocking device is a U shaped bracket 85 in the arms of which is journaled a shaft 86 carrying a presser roll 87 and having a gear 88 in engagement with the carrier gear 31. The pinion 88 in its turn drives a pair of delivery rolls 89 and 90 mounted upon shafts 91 and 92 respectively, which are also journaled in the arms of the bracket 85 and which may carry gears 93 and 94, respectively, the former of which may be driven from the pinion 88 through the intervention of an intermediate 95. A delivery plate 96 may be disposed between the presser roll 87 and the delivery rolls 89, 90.

The operation of my improved machine is as follows: Bellows-sided or tucked tubing is introduced into the machine by the feed rolls, 13, 14, and guided by the guide plate 72 into position between the blank-folding member 44 and the carrier 23 in such a manner that the tuck-holders 35 and the front diamond holder 39 will engage the lower ply of the blank, as seen in Figs. 3 and 5, and will thus be carried along by the carrier in the direction of the arrow. While the blank is delivered to these holders, the box-holders 62 of the blank-folding member 44 are open, and the movement of the blank folding member with the box-holders is so timed that the front edges of the tuck-holders and the box-holders come into alinement with each other, at which time both tuck-holders and box-holders will close on the blank sides, and then the carrier and the defining edge 45 of the blank-folding member will travel in unison during the formation of the diamond. While the defining edge 45 of the blank-folding member is traveling in unison with the blank-carrier, the pivot axis of the blank-folding member is also advancing in the direction of travel of the carrier, and at the same time an oscillatory motion is imparted to said folding member, this motion resulting in opening-out the open end of the tube or blank, as shown in Figs. 6 and 7, and then to the position shown in Figs. 8 and 9. During this time the blank-carrier is, at first, shifted bodily away from the defining edge to maintain the required separation between the tube sides, and it is then shifted back to approach the edge, as shown in Figs. 8 and 9 of the drawings when the inside triangular folds have been fully developed and the diamond has been substantially completed. At this time the drop plate is forced downward to flatten the diamond and the box-holders are caused to release the blank which is now carried under the roller 81, and under the presser roll 87, after which the delivery plate 96 will guide the blank toward the delivery rolls 89 and 90 and subsequently to flap-folding devices (not shown) there to be transformed into the completed bag. After the box-holders have released the blank, the folding member will remain in the position shown in Fig. 8 until the blank has been drawn forward to clear the box-holders, whereupon said folding member will immediately return to its normal position, see Fig. 5, the blank-carrier being cut away sufficiently, as shown, so as to afford room for the defining edge to swing clear of, and to prevent interference with, the carrier.

It is evident that many changes may be made in the particular construction and organization of the elements of my improved machine without departing from the gist of my invention.

In my copending applications, Serial Nos. 27,864, filed October 23, 1900, 32,123, filed October 5, 1900, 35,086, filed November 1, 1900, and 36,177, filed November 12, 1900, I have claimed certain novel improvements in bag machines which are shown and described, but not claimed in this application. This application is therefore to be understood as being subordinate to said copending applications insofar as it shows in common the novel features claimed in said copending applications.

Having described my invention what I claim as new and desire to secure by Letters Patent is:

1. The combination, with a blank support having a shiftable axis and provided with tuck holders, of a folding member provided with means including a defining edge for engaging and turning back the ply of a bag blank carried by the said support, and a movable carrier for pivotally supporting said folding member.

2. The combination, with a rotatable support having a shiftable axis and provided with tuck holders, of a folding member provided with means including a defining edge for engaging and turning back the ply of a bag blank carried by the support, and a movable carrier pivotally supporting said folding member.

3. The combination, with a rotatable blank support provided with tuck holders, of a folding member provided with means including a defining edge for engaging and turning back the ply of a bag blank carried by the support, a movable carrier for pivotally supporting said folding member and means for shifting the axis of the blank support toward and away from said folding member.

4. The combination, with a rotatable blank support having a shiftable axis and provided with tuck holders, of a folding plate provided with means including a defining edge for engaging and turning back the ply of a bag blank carried by the support, a movable carrier pivotally supporting said plate, and means for supporting said carrier for swinging movement.

5. The combination with a rotatable blank support having a shiftable axis and provided with tuck holders, of a folding plate provided with means including a defining edge for engaging and turning back the ply of a bag blank carried by the support, movable arms pivotally supporting said folding plate, and means for swinging the said arms in the general direction of travel of the blank support.

6. The combination, with a blank support having a shiftable axis and provided with tuck holders, of a folding plate having box holders and a defining edge, a plate carrier having a fixed pivot axis and supporting the said plate for swinging movement, and means for swinging the said folding plate in its carrier.

7. The combination, with a blank support having a shiftable axis and tuck holders, of a folding plate having box holders and a defining edge, a plate carrier supported on a fixed pivot axis and supporting the folding plate for swinging movement, and gearing for swinging the plate.

8. The combination, with a blank support having a shiftable axis and having tuck holders, of a folding plate having box holders and a defining edge, a folding-plate carrier supported on a fixed pivot axis and pivotally supporting the said folding plate, and a cam operated sector for swinging the said plate.

9. The combination, with a blank support having a shiftable axis and having tuck holders, of a folding plate having box holders and a defining edge, a plate carrier supported on a fixed pivot axis and pivotally supporting the said folding plate, and a sector eccentrically pivoted relative to the blank support axis for swinging the said folding plate on the carrier.

10. The combination, with a rotary blank support journaled in movable bearings and having tuck holders, of a member having box holders and a defining edge, means for moving the said bearings, and means for advancing the said folding member with the blank support.

11. The combination, with a rotatable blank support having a shiftable axis, of a folding member provided with means including a defining edge for folding back the ply of a bag blank carried by the support, and means for shifting the said axis to separate the surface of the blank support from the said defining edge during the folding back operation.

12. The combination, with a rotatable blank support having a shiftable axis, of a folding member provided with means including a defining edge for folding back the ply of a bag blank carried by the support, means for moving said edge forward in unison with the blank support during its folding back movement; and means for shifting the said axis to separate the surface of the blank support from said defining edge during said folding back operation.

13. The combination, with a blank support having tuck holders, of movable arms supporting the said blank support for rotation, a folding member having means including a defining edge for folding back the ply of a bag blank carried by the support, and means for moving said arms to separate the surface of said blank support from the said defining edge during the folding back operation.

14. The combination, with a blank support having tuck holders, of movable arms supporting said blank support for rotation, a folding member provided with means including a defining edge for folding back the ply of a bag blank carried by the support, and a cam for moving said arms to separate the surface of the blank support from the defining edge during the turning back operation.

15. The combination, with a rotatable blank support having tuck holders, movable arms for supporting said blank support, a folding member having a defining edge and box holders, means carried by said arms for opening the box holders, and means for moving the arms to carry the surface of the blank support a substantial distance away from said defining edge during its operation.

16. The combination, with a rotary blank support having a shiftable axis and provided with tuck holders, of a folding member provided with means including a defining edge for folding back the ply of a bag blank carried by the support, means for shifting the axis of the blank support to carry its surface a substantial distance away from the defining edge during the folding back operation, and means for advancing the folding member in the direction of travel of the blank support during the said folding back operation.

17. The combination, with a rotary blank support having a shiftable axis and provided with tuck holders, of a folding plate provided with means including a defining edge for folding back the ply of a bag blank carried by the support, a movable carrier supporting the said folding plate for swinging movement, means for shifting the said axis to separate the surface of the blank support a substantial distance from the defining edge during the folding back operation, and means for advancing the plate carrier in the general direction of travel of the blank support during the said operation.

WILLIAM A. LORENZ.

Witnesses:

CHAS. F. SCHMELZ,

NELLIE PHOENIX.